(12) United States Patent
Fukuda et al.

(10) Patent No.: US 12,104,009 B2
(45) Date of Patent: *Oct. 1, 2024

(54) EPOXY RESIN, EPOXY RESIN COMPOSITION, EPOXY RESIN CURED PRODUCT AND METHOD OF PRODUCING EPOXY RESIN CURED PRODUCT, COMPOSITE MATERIAL, INSULATING MEMBER, ELECTRONIC APPLIANCE, STRUCTURAL MATERIAL, AND VEHICLE

(71) Applicant: RESONAC CORPORATION, Tokyo (JP)

(72) Inventors: Kazumasa Fukuda, Tokyo (JP); Yoshitaka Takezawa, Tokyo (JP); Tomoko Higashiuchi, Tokyo (JP); Naoki Maruyama, Tokyo (JP); Shingo Tanaka, Tokyo (JP)

(73) Assignee: RESONAC CORPORATION, Tokyo (JP)

(*) Notice: Subject to any disclaimer, the term of this patent is extended or adjusted under 35 U.S.C. 154(b) by 618 days.

This patent is subject to a terminal disclaimer.

(21) Appl. No.: 16/971,307

(22) PCT Filed: Feb. 22, 2018

(86) PCT No.: PCT/JP2018/006565
§ 371 (c)(1),
(2) Date: Aug. 20, 2020

(87) PCT Pub. No.: WO2019/163067
PCT Pub. Date: Aug. 29, 2019

(65) Prior Publication Data
US 2020/0385512 A1   Dec. 10, 2020

(51) Int. Cl.
*C08G 59/24* (2006.01)
*C08G 59/22* (2006.01)
*C08G 59/28* (2006.01)
*C08J 5/04* (2006.01)
*C08K 5/00* (2006.01)
*C08L 63/00* (2006.01)
*C08L 63/02* (2006.01)

(52) U.S. Cl.
CPC ......... *C08G 59/226* (2013.01); *C08G 59/245* (2013.01); *C08G 59/28* (2013.01); *C08J 5/04* (2013.01); *C08K 5/0025* (2013.01); *C08G 2250/00* (2013.01)

(58) Field of Classification Search
None
See application file for complete search history.

(56) References Cited

U.S. PATENT DOCUMENTS

| | | | | |
|---|---|---|---|---|
| 9,242,948 | B2* | 1/2016 | Asaumi | C08L 63/00 |
| 10,800,872 | B2* | 10/2020 | Maruyama | C08G 59/066 |
| 10,920,010 | B2* | 2/2021 | Maruyama | C08G 59/20 |
| 10,988,585 | B2* | 4/2021 | Nishiyama | C08L 61/12 |
| 11,015,020 | B2* | 5/2021 | Higashiuchi | C08G 59/20 |
| 11,440,990 | B2* | 9/2022 | Yoshida | C08G 59/24 |
| 11,466,119 | B2* | 10/2022 | Fukuda | C08G 59/24 |
| 2015/0332984 | A1* | 11/2015 | Kawate | H01L 21/561 252/76 |
| 2017/0349695 | A1* | 12/2017 | Katagi | C08J 5/18 |
| 2020/0392282 | A1* | 12/2020 | Maruyama | C08G 59/14 |

FOREIGN PATENT DOCUMENTS

| | | | | |
|---|---|---|---|---|
| JP | 2001-114981 | A | | 4/2001 |
| JP | 2010-001427 | A | | 1/2010 |
| JP | 2010-018679 | A | | 1/2010 |
| JP | 2013006893 | A * | 1/2013 | ............ C08L 63/00 |
| JP | 2013-194166 | A | | 9/2013 |
| JP | 2017-123252 | A | | 7/2017 |
| WO | 2013/183667 | A1 | | 12/2013 |
| WO | WO-2016104772 | A1 * | 6/2016 | ............ C08G 59/24 |
| WO | 2017/145412 | A1 | | 8/2017 |

OTHER PUBLICATIONS

Abstract of JP-2013006893-A (no date).*
Tisanao Yamamoto et al., "Toughening Mechanism of Liquid Crystalline Epoxy Resin with Spacers Outside the Mesogenic Group", Molecular Crystals and Liquid Crystals, vol. 609, No. 1, Mar. 4, 2015, pp. 80-92 retrieved from www.tandfonline.com/loi/gmcl20.

* cited by examiner

*Primary Examiner* — Michael J Feely
(74) *Attorney, Agent, or Firm* — SOLARIS Intellectual Property Group, PLLC (57) ABSTRACT

(1) An epoxy resin, which is configured to form, in a cured product of the epoxy resin, a phase-separated structure that is formed from at least two phases, wherein at least one phase of the at least two phases includes a liquid crystal structure and (2) An epoxy resin, which is configured to form a phase-separated structure in a cured product, the cured product being obtained by curing the epoxy resin by increasing a temperature of the epoxy resin from an ambient temperature to a curing temperature at a rate of not greater than 20° C./minute.

7 Claims, 2 Drawing Sheets

EPOXY RESIN, EPOXY RESIN COMPOSITION, EPOXY RESIN CURED PRODUCT AND METHOD OF PRODUCING EPOXY RESIN CURED PRODUCT, COMPOSITE MATERIAL, INSULATING MEMBER, ELECTRONIC APPLIANCE, STRUCTURAL MATERIAL, AND VEHICLE

TECHNICAL FIELD

The invention relates to an epoxy resin, an epoxy resin composition, an epoxy resin cured product, a method of producing an epoxy resin cured product, a composite material, an insulating member, an electronic appliance, a structural material, and a vehicle.

BACKGROUND ART

Recently, reduction in the weight of vehicles, such as airplanes and automobiles, has been promoted with the aim of improving fuel efficiency. Therefore, materials referred to as CFRPs (Carbon Fiber Reinforced Plastics) have been attracting attention as an alternative to metals.

Since CFRPs have a high degree of specific strength (strength/density), CFRPs are expected to achieve both weight saving and increased strength, and substitution of metals with CFRPs has been actively practiced. However, it is known that resins and ceramics are prone to brittle fracture rapidly, unlike ductile fracture of metals, once stress exceeds a certain threshold. As such, it is expected that CFRPs, which are a composite material of resins and ceramics, are also prone to brittle fracture. Therefore, improvement in the toughness of the resin used for the CFRPs is required.

As a means for increasing the toughness of the resin, addition of a plasticizer is generally known. However, addition of a plasticizer may cause reduction in the strength and heat resistance of a cured product of the resin. Therefore, a method of using an epoxy resin having liquid crystallinity (see, for example, Patent Document 1) has been studied.

PRIOR ART DOCUMENT

Patent Document

Patent Document 1: Japanese Patent Application Laid-Open (JP-A) No. 2010-001427

SUMMARY OF THE INVENTION

Problem to be Solved by the Invention

It is known that an epoxy resin having liquid crystallinity forms a higher-order structure inside a cured product of the epoxy resin, and the toughness of the cured product is improved by the higher-order structure. However, there is a limit on the improvement achieved by this method, and demands for further improvement in toughness may not be met.

In view of these circumstances, the invention aims to provide an epoxy resin and an epoxy resin composition that are capable of forming a cured product having excellent toughness; an epoxy resin cured product obtained by using the same and a method of producing the epoxy resin cured product; a composite material; an insulating member; an electronic appliance; a structural material; and a vehicle.

Means for Solving the Problem

The means for solving the problem as mentioned above include the following embodiments.

<1> An epoxy resin, which is configured to form, in a cured product of the epoxy resin, a phase-separated structure that is formed from at least two phases, wherein at least one phase of the at least two phases includes a liquid crystal structure.

<2> The epoxy resin according to <1>, wherein the at least one phase includes a smectic structure or a nematic structure as the liquid crystal structure.

<3> The epoxy resin according to <1> or <2>, wherein the at least one phase includes a smectic structure as the liquid crystal structure, and at least one other phase of the at least two phases includes a nematic structure as the liquid crystal structure.

<4> An epoxy resin, which is configured to form a phase-separated structure in a cured product, the cured product being obtained by curing the epoxy resin by increasing a temperature of the epoxy resin from an ambient temperature to a curing temperature at a rate of not greater than 20° C./minute.

<5> The epoxy resin according to <4>, wherein the phase-separated structure is formed from at least two phases and at least one phase of the at least two phases includes a liquid crystal structure.

<6> The epoxy resin according to <5>, wherein the at least one phase includes a smectic structure or a nematic structure as the liquid crystal structure.

<7> The epoxy resin according to <5> or <6>, wherein the at least one phase includes a smectic structure as the liquid crystal structure, and at least one other phase of the at least two phases includes a nematic structure as the liquid crystal structure.

<8> The epoxy resin according to any one of <1> to <7>, comprising a liquid crystal epoxy compound and a multimer of the epoxy compound.

<9> The epoxy resin according to any one of <1> to <8>, comprising a liquid crystal epoxy compound A and an epoxy compound B that has a different structure from a structure of the liquid crystal epoxy compound A.

<10> The epoxy resin according to <9>, wherein the epoxy compound B is an epoxy compound that forms a different liquid crystal structure from a liquid crystal structure formed by the liquid crystal compound A or is an epoxy compound that does not form a liquid crystal structure.

<11> The epoxy resin according to <9> or <10>, wherein the epoxy compound B comprises a biphenyl epoxy compound or a bisphenol epoxy compound.

<12> The epoxy resin according to any one of <1> to <11>, comprising an epoxy compound having a mesogenic structure.

<13> The epoxy resin according to any one of <1> to <12>, comprising an epoxy compound represented by the following Formula (A):

(A)

wherein, in Formula (A), X represents a linking group that includes at least one selected from the group consisting of divalent groups in the following Group (I), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group, and each n independently represents an integer from 0 to 4:

Group (1)

wherein, in Group (I), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group, each n independently represents an integer from 0 to 4, k represents an integer from 0 to 7, m represents an integer from 0 to 8, and l represents an integer from 0 to 12.

<14> The epoxy resin according to any one of <1> to <13>, comprising an epoxy compound represented by the following Formula (M):

wherein, in Formula (M), each of $R^1$ to $R^4$ independently represents a hydrogen atom or an alkyl group having 1 to 3 carbon atoms.

<15> An epoxy resin composition, comprising the epoxy resin according to any one of <1> to <14>, and a curing agent.

<16> The epoxy resin composition according to <15>, wherein the curing agent is an amine curing agent.

<17> The epoxy resin composition according to <15> or <16>, wherein the curing agent is an aromatic compound.

<18> The epoxy resin composition according to any one of <15> to <17>, further comprising a filler.

<19> A method of producing an epoxy resin cured product, the method comprising:

a process of increasing a temperature of the epoxy resin composition according to any one of <15> to <18> from an ambient temperature to a curing temperature at a rate of not greater than 20° C./minute; and a process of curing the epoxy resin composition at the curing temperature.

<20> An epoxy resin cured product, comprising a phase-separated structure that is formed from at least two phases, at least one phase of the at least two phases including a liquid crystal structure.

<21> The epoxy resin cured product according to <20>, wherein the at least one phase includes a smectic structure or a nematic structure as the liquid crystal structure.

<22> The epoxy resin cured product according to <20> or <21>, wherein the at least one phase includes a smectic structure as the liquid crystal structure, and at least one other phase of the at least two phases includes a nematic structure as the liquid crystal structure.

<23> A composite material, comprising the epoxy resin cured product according to any one of <20> to <22>, and a reinforcing material.

<24> An insulating member, comprising the epoxy resin cured product according to any one of <20> to <22> or the composite material according to <23>.

<25> An electronic appliance, comprising the insulating member according to <24>.

<26> A structural material, comprising the epoxy resin cured product according to any one of <20> to <22> or the composite material according to <23>.

<27> A vehicle, comprising the structural material according to <26>.

Effect of the Invention

According to the invention, an epoxy resin and an epoxy resin composition that are capable of forming a cured product having excellent toughness are provided. Further, an epoxy resin cured product obtained by using the same and a method of producing the epoxy resin cured product; a composite material; an insulating member; an electronic appliance; a structural material; and a vehicle are provided.

EMBODIMENTS FOR IMPLEMENTING THE INVENTION

In the disclosure, the "process" refers not only to a process that is independent from the other steps, but also to a step that cannot be clearly distinguished from the other steps, as long as the aim of the process is achieved.

In the disclosure, the numerical range represented by "A to B" includes A and B as a minimum value and a maximum value, respectively.

In the disclosure, when numerical ranges are described in a stepwise manner, the values of the upper or lower limit of each numerical range may be substituted by the values of the upper or lower limit of the other numerical range, or may be substituted by the values described in the Examples.

In the disclosure, when there are more than one kind of substance corresponding to a component of a composition, the content of the component refers to a total content of the substances, unless otherwise stated.

In the disclosure, when there are more than one kind of particles corresponding to a component of a composition, the particle size of the component refers to a particle size of a mixture of the more than one kind of particles.

In the disclosure, the epoxy compound refers to a compound having an epoxy group in its molecule. The epoxy resin refers to a collective concept of epoxy compounds that are not in a cured state. The liquid crystal epoxy compound refers to an epoxy compound that forms a liquid crystal structure when it is cured.

Epoxy Resin (First Embodiment)

The epoxy resin of the first embodiment is an epoxy resin, which is configured to form, in a cured product of the epoxy resin, a phase-separated structure that is formed from at least two phases, wherein at least one phase of the at least two phases includes a liquid crystal structure.

The inventors have found that a cured product of an epoxy resin, in which a phase-separated structure that is formed from two or more phases and at least one phase includes a liquid crystal structure is formed, exhibits superior toughness as compared with a cured product of an epoxy resin in which a phase-separated structure as mentioned above is not formed.

The phase-separated structure formed in a cured product of an epoxy resin is not particularly limited, as long as it is formed from two or more phases and at least one phase thereof includes a liquid crystal structure. For example, the phase-separated structure may be a sea-and-island structure that is formed from a continuous phase and a domain phase that is dispersed in the continuous phase, or may be formed from continuous phases.

The type of the liquid-crystal structure included in at least one phase of the phase-separated structure is not particularly limited, and examples thereof include a smectic structure, a nematic structure and an intermediary structure of these structures.

From the viewpoint of increasing the toughness of a cured product, the phase-separated structure preferably has at least one phase including a smectic structure or a nematic structure; more preferably has at least one phase including a smectic structure; further preferably has at least one phase including a smectic structure and has at least one other phase including a nematic structure.

The state of the phase-separated structure and the liquid crystal structure in the epoxy resin cured product may be observed with a polarization microscope, for example.

It is also possible to determine whether or not a cured product of the epoxy resin includes a smectic structure by X-ray diffraction measurement. Specifically, when a diffraction peak exists within a range where $2\theta$ is from 1° to 10°, obtained by performing X-ray diffraction measurement by a method as described in the Examples, it can be determined that a cured product includes a smectic structure.

From the viewpoint of increasing the toughness of a cured product, it is preferred that the phase-separated structure includes a smectic structure at a rate of 60% or more, more preferably 80% or more.

The proportion of a smectic structure in the phase-separated structure may be determined by observing a section of a cured product with a polarization microscope. In that case, the proportion of a smectic structure in the phase-separated structure may be calculated as a proportion of an area (%) that corresponds to a smectic structure with respect to the total area of the field of view.

In a case in which the phase-separated structure includes a continuous phase and a domain phase dispersed therein, from the viewpoint of increasing the toughness of a cured product, it is preferred that the continuous phase (sea) includes a nematic structure and the domain phase (island) includes a smectic structure.

From the viewpoint of increasing the toughness of a cured product, it is preferred that at least one phase that forms the phase-separated structure includes a smectic structure, and the smectic structure has a length of period of the periodic structure (period length) of from 2.0 nm to 3.0 nm. When the period length of the smectic structure is from 2.0 nm to 3.0 nm, a high degree of toughness can be achieved due to a high degree of order of the smectic structure.

The period length of the smectic structure may be determined by, for example, by converting a diffraction angle, which is obtained by performing X-ray diffraction measurement by a method as described in the Examples, according to the Bragg equation.

Epoxy Resin (Second Embodiment)

The epoxy resin of the second embodiment is an epoxy resin, which is configured to form a phase-separated structure in a cured product, the cured product being obtained by curing the epoxy resin by increasing a temperature of the epoxy resin from an ambient temperature (25°) to a curing temperature at a rate of not greater than 20° C./minute.

The inventors have found that a cured product obtained by curing the epoxy resin, which is configured to form a phase-separated structure in a cured product, under the conditions as described above exhibits superior toughness as compared with a cured product obtained by curing the epoxy resin that does not form a phase-separated structure in a cured product.

The phase-separated structure formed in a cured product is formed from two or more phases, and at least one phase preferably includes a liquid crystal structure. Details and preferred embodiments of the phase-separated structure may refer to the details and preferred embodiments of the phase-separated structure formed in a cured product of the epoxy resin of the first embodiment.

The rate of increasing the temperature of the epoxy resin from an ambient temperature to a curing temperature at a rate of not greater than 20° C./minute may be constant or variable.

The rate of increasing the temperature of the epoxy resin from an ambient temperature to a curing temperature is not particularly limited as long as it is not greater than 20° C./minute. From the viewpoint of increasing the toughness of a cured product, the rate of increasing the temperature is preferably not greater than 15° C./minute.

The lower limit of the rate of increasing the temperature of the epoxy resin is not particularly limited. From the viewpoint of increasing the toughness of a cured product, the rate of increasing the temperature is preferably 0.1° C./minute or more, more preferably 5° C./minute or more.

(Epoxy Compound)

The epoxy resin preferably includes, as an epoxy compound, an epoxy compound that forms a liquid crystal structure upon curing (also referred to as a liquid-crystal epoxy compound).

Examples of a liquid crystal epoxy compound includes an epoxy compound having a mesogenic structure in the molecule. Examples of the mesogenic structure includes a biphenyl structure, a phenyl benzoate structure, a cyclohexyl benzoate structure, an azobenzene structure, a stilbene structure, a terphenyl structure, an anthracene structure, a derivative of these structures and a structure in which two or more of these structures are bonded via a linking group. An epoxy compound having a mesogenic structure has a property of forming a higher-order structure in a cured product obtained by curing the same.

The epoxy compound having a mesogenic structure forms, in a cured product obtained by curing the epoxy compound with a curing agent, a higher-order structure (also referred to as a periodic structure) that derives from the mesogenic structure. The higher-order structure (periodic structure) refers to a structure in which molecules of the epoxy compound are oriented in a cured product. The higher-order structure in the cured product is in a state of a crystal structure or a liquid crystal structure.

Whether or not a crystal structure or a liquid crystal structure is formed in a cured product may be determined by, for example, observing with a polarization microscope under crossed Nicols or by performing X-ray diffraction (XRD) measurement. Alternatively, the existence of a liquid structure or a liquid crystal structure may be determined in an indirect manner by measuring a change in the storage elastic modulus with respect to a temperature, because a cured product including a crystal structure or a liquid crystal structure tends to exhibit a small change in the storage elastic modulus with respect to a temperature.

Examples of the liquid crystal structure derived from the mesogenic structure of the epoxy compound includes a smectic structure or a nematic structure. The nematic structure is a structure in which the long axis of the molecule of the epoxy compound is oriented in a uniform direction and has only an orientation order. The smectic structure is a structure that has a layered structure at a certain period with a unidimensional positional order, in addition to an orientation order. The smectic structure includes domains formed from an aggregate of the same periodical structure, which function to disperse the stress applied to a cured product. Accordingly, a cured product including a smectic structure tends to exhibit superior toughness as compared with a cured product including a nematic structure.

Examples of an epoxy compound having a mesogenic structure include an epoxy compound represented by the following Formula (A).

(A)

In Formula (A), X represents a linking group that includes at least one divalent group selected from the following Group (I); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; and each n independently represents an integer from 0 to 4.

Group (I)

In Group (I), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

In Formula (A) and Group (I), each Y is preferably independently an aliphatic hydrocarbon group having 1 to 8 carbon atoms, more preferably an alkyl group having 1 to 3 carbon atoms, further preferably an alkyl group having 1 or 2 carbon atoms, yet further preferably a methyl group. Each of n, k, m or l is preferably independently 0.

The epoxy compound represented by Formula (A) may be a compound in which X is a linking group that includes each of the divalent groups as described below.

The liquid crystal epoxy compound may be an epoxy compound having at least one structure represented by the following Formula (I).

(I)

In Formula (I), each of $R^1$ to $R^4$ independently represents a hydrogen atom or an alkyl group having 1 to 3 carbon atoms, preferably a hydrogen atom or an alkyl group having 1 or 2 carbon atoms, more preferably a hydrogen atom or a methyl group. The number of hydrogen atoms represented by $R^1$ to $R^4$ is preferably 2 to 4, more preferably 3 or 4, further preferably 4. When any of $R^1$ to $R^4$ is an alkyl group having 1 to 3 carbon atoms, the alkyl group having 1 to 3 carbon atoms is preferably at least one of $R^1$ or $R^4$.

Examples of the epoxy compound having one of the structure represented by Formula (I) include an epoxy compound represented by the following Formula (M).

(M)

The specific examples and preferred ranges of $R^1$ to $R^4$ in Formula (M) are the same as the specific examples and preferred ranges of $R^1$ to $R^4$ in Formula (I).

Examples of the epoxy compound represented by Formula (M) include a compound described in Japanese Patent Application Laid-Open No. 2011-74366, i.e., at least one selected from the group consisting of (4-{4-(2,3-epoxypropoxy)phenyl}cyclohexyl=4-(2,3-epoxypropoxy)benzoate and (4-{4-(2,3-epoxypropoxy)phenyl}cyclohexyl=4-(2,3-epoxypropoxy)-3-methylbenzoate.

The epoxy resin may include a liquid crystal epoxy compound and a multimer of the liquid crystal epoxy compound (also referred to as a prepolymer). A liquid crystal epoxy compound (in particular, an epoxy compound having a mesogenic structure) is generally prone to crystallization and is less soluble in a solvent, as compared with an epoxy compound of other kinds. When the epoxy resin is in a state of a prepolymer, i.e., including a multimer obtained by reacting a part of the liquid crystal epoxy compound, crystallization thereof tends to be suppressed and processability of an epoxy resin composition including the epoxy resin tends to improve.

The multimer of the liquid crystal epoxy compound is not particularly limited, as long as it includes a structure derived from two or more liquid crystal epoxy compounds (preferably a mesogenic structure) in the molecule. Specific examples of the liquid crystal epoxy compound include a compound obtained by causing a liquid crystal epoxy compound to react with a compound having two or more functional groups that can react with an epoxy group of the liquid crystal epoxy compound (also referred to as a prepolymerization agent).

The type of the prepolymerization agent is not particularly limited. From the viewpoint of forming a smectic structure in a cured product, the prepolymerization agent is preferably at least one selected from the group consisting of a dihydroxybenzene compound, having a structure in which two hydroxy groups are bonded to a benzene ring; a diaminobenzene compound, having a structure in which two amino groups are bonded to a benzene ring; a dihydroxy biphenyl compound, having a structure in which two hydroxy groups are bonded to each of the benzene rings that form a biphenyl structure, respectively; and a diaminobiphenyl compound, having a structure in which two amino groups are bonded to each of the benzene rings that form a biphenyl structure, respectively (hereinafter, also referred to as specific aromatic compounds).

Examples of the dihydroxybenzene compound include catechol, resorcinol, hydroquinone, and derivatives thereof.

Examples of the diaminobenzene compound include 1,2-diaminobenzene, 1,3-diaminobenzene, 1,4-di aminobenzene, and derivative thereof.

Examples of the dihydroxybiphenyl compound include 2,2'-dihydroxybiphenyl, 2,3'-dihydroxybiphenyl, 2,4'-dihydroxybiphenyl, 3,3'-dihydroxybiphenyl, 3,4'-dihydroxybiphenyl, and derivatives thereof.

Examples of the diaminobiphenyl compound include 2,2'-diaminobiphenyl, 2,3'-diaminoibiphenyl, 2,4'-diaminobiphenyl, 3,3'-diaminobiphenyl, 3,4'-diaminobiphenyl, and derivatives thereof.

Derivatives of the specific aromatic compound include a specific aromatic compound having a substitute, such as an alkyl group having 1 to 8 carbon atoms, on the benzene ring. A single kind of the specific aromatic compound may be used alone, or two or more kinds may be used in combination.

Among the specific aromatic compounds, hydroquinone, 1,4-diaminobenzene, 4,4'-dihydroxybiphenol (4,4'-biphenol), 4,4'-diaminobiphenyl and derivative thereof are preferred. These compounds has the functional groups at a para position on the benzene ring, and a multimer obtained through reaction with a liquid crystal epoxy monomer tends to have a linear structure. Therefore, it is considered that the molecules have a high degree of stacking property and a smectic structure is easily formed in a cured product.

A reaction catalyst may be used for the reaction of a liquid crystal epoxy compound and a prepolymerization agent. The type of the reaction catalyst is not particularly limited, and may be selected depending on the reaction rate, reaction temperature, storage stability, and the like. Specific examples of the reaction catalyst include an imidazole compound, an organic phosphorous compound, a tertiary amine compound and a quaternary ammonium salt. A single kind of the reaction catalyst may be used alone, or two or more kinds may be used in combination.

It is possible to adjust the ratio of the multimer in the liquid crystal epoxy compound, the molecular weight of the multimer or the like, by adjusting the mixing ratio of the liquid crystal epoxy compound and the prepolymerization agent to be reacted.

For example, the mixing ratio may be adjusted such that the equivalent ratio of the epoxy group of the liquid crystal epoxy compound and the functional group of the prepolymerization agent (epoxy group/functional group) is from 100/5 to 100/50, or from 100/10 to 100/30.

When the liquid crystal epoxy compound is an epoxy compound represented by Formula (A), the multimer thereof may be an epoxy compound having a structure represented by the following Formula (1-A) or Formula (1-B).

In Formulae (1-A) and (1-B), definitions and preferred examples of X, Y and n are the same as the definitions and preferred examples of X, Y and n in Formula (A). Each of $R^1$, $R^2$ independently represents an alkyl group having 1 to 8 carbon atoms, preferably an alkyl group having 1 to 3 carbon atoms, more preferably a methyl group. Each m independently represents an integer from 0 to 4. Each Z independently represents —O— or —NH—.

From the viewpoint of forming a higher-order structure, the epoxy compound having a structure represented by Formula (1-A) is preferably an epoxy compound having a structure represented by Formula (2-A), and the epoxy compound having a structure represented by Formula (1-B) is preferably an epoxy compound having a structure represented by Formula (2-B).

In Formulae (2-A) and (2-B), definitions and preferred examples of X, Y, n, m, $R^1$, $R^2$ and Z are the same as the definitions and preferred examples of X, Y, n, m, $R^1$, $R^2$ and Z in Formulae (1-A) and (1-B).

Examples of the epoxy compound having a structure represented by Formula (1-A) include an epoxy compound having a structure selected from the group consisting of the following Formulae (3-A-1) and (3-A-2).

Examples of the epoxy compound having a structure represented by Formula (1-B) include an epoxy compound having a structure selected from the group consisting of the following Formulae (3-B-1) and (3-B-2).

In Formulae (3-A-1), (3-A-2), (3-B-1) and (3-B-2), each of $R^3$ to $R^6$ independently represents a hydrogen atom or an alkyl group having 1 to 3 carbon atoms. Definitions and preferred examples of $R^1$, $R^2$, m and Z are the same as the definitions and preferred examples of $R^1$, $R^2$, m and Z in Formulae (1-A) and (1-B).

In the multimer of a liquid crystal epoxy compound, the number of the structure derived from the liquid crystal epoxy compound is not particularly limited as long as it is two or more. From the viewpoint of reducing the viscosity during processing, at least a part of the multimer is preferably a compound having two structures derived from the liquid crystal epoxy compound (referred to as a dimer compound).

Examples of the liquid crystal epoxy compound as a dimer compound include an epoxy compound represented by the following Formula (4-A-1) or Formula (4-B-1).

In Formulae (4-A-1) and (4-B-1), definitions and preferred examples of X, Y, n, m, $R^1$, $R^2$ and Z are the same as the definitions and preferred examples of X, Y, n, m, $R^1$, $R^2$ and Z in Formulae (1-A) and (1-B).

From the viewpoint of forming a higher-order structure, the epoxy compound having a structure represented by Formula (4-A-1) is preferably an epoxy compound having a structure represented by the following Formula (5-A-1), and the epoxy compound having a structure represented by Formula (4-B-1) is preferably an epoxy compound having a structure represented by the following Formula (5-B-1).

(5-B-1)

In Formulae (5-A-1) and (5-B-1), definitions and preferred examples of X, Y, n, m, $R^1$, $R^2$ and Z are the same as the definitions and preferred examples of X, Y, n, m, $R^1$, $R^2$ and Z in Formulae (4-A-1) and (4-B-1).

Specific examples of the epoxy compound having a structure represented by Formula (4-A-1) and Formula (I) include an epoxy compound having a structure represented by the following Formulae (6-A-1) to (6-A-3).

Specific examples of the epoxy compound having a structure represented by Formula (4-B-1) and Formula (I) include an epoxy compound having a structure represented by the following Formulae (6-B-1) to (6-B-3).

(6-B-3)

In Formulae (6-A-1) to (6-A-3) and Formulae (6-B-1) to (6-B-3), definitions and preferred examples of $R^3$ to $R^6$, $R^1$, $R^2$, m and Z are the same as the definitions and preferred examples of $R^3$ to $R^6$, $R^1$, $R^2$, m and Z in Formulae (3-A-1), (3-A-2) and Formulae (3-B-1) and (3-B-2).

The epoxy resin may include a liquid crystal epoxy compound A and an epoxy compound B that has a different structure from the structure of the liquid crystal epoxy compound A (except a multimer of the liquid crystal epoxy compound A).

By including a liquid crystal epoxy compound A and an epoxy compound B that has a different structure from the structure of the liquid crystal epoxy compound A, it becomes easier for the epoxy resin to form a phase-separated structure in a cured product, as compared with an epoxy resin that includes only a liquid crystal epoxy compound A.

When the epoxy resin includes a liquid crystal epoxy compound A and an epoxy compound B that has a different structure from the structure of the liquid crystal epoxy compound A, the epoxy compound B may be a liquid crystal epoxy compound or an epoxy compound that is not a liquid crystal epoxy compound (i.e., an epoxy compound that does not form a liquid crystal structure alone). From the viewpoint of forming a phase-separated structure in a cured product, the epoxy compound B is preferably an epoxy compound that forms a liquid crystal structure that is different from a liquid crystal structure formed by the liquid crystal epoxy compound A, or an epoxy compound that does not form a liquid crystal structure.

When the epoxy resin includes a liquid crystal epoxy compound A and an epoxy compound B that has a different structure from the structure of the liquid crystal epoxy compound A, the type of the epoxy compound B is not particularly limited. From the viewpoint of forming a phase-separated structure in a cured product, the epoxy compound B preferably includes a biphenyl epoxy compound or a bisphenol epoxy compound.

Examples of the biphenyl epoxy compound include an epoxy compound represented by the following Formula (B).

In Formula (B), each Z independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; and each n independently represents an integer from 0 to 4.

In Formula (B), each Z preferably independently represents an aliphatic hydrocarbon group having 1 to 8 carbon atoms, more preferably a methyl group. Each Z preferably independently is at a meta position with respect to the single bond of the biphenyl structure.

Each n preferably independently represents an integer from 1 to 3, more preferably 1 or 2.

Examples of the compound represented by Formula (B) include an epoxy compound having a structure represented by the following structure (each R independently represents a hydrogen atom or a methyl group).

Examples of the bisphenol epoxy compound include a glycidyl ether of a phenol compound such as bisphenol A, bisphenol F and bisphenol S.

Examples of the epoxy compound B, other than a bisphenyl epoxy compound or a bisphenol epoxy compound, include a glycidyl ether of an alcohol compound such as butanediol, polyethylene glycol and polypropylene glycol; a glycidyl ester of a carboxylic acid compound such as phthalic acid, isophthalic acid and tetrahydrophthalic acid; a compound obtained by substituting an active hydrogen bound to a nitrogen atom of aniline, isocyanuric acid and the like; an alicyclic epoxy compound obtained by epoxidizing an olefin bond in the molecule, such as vinylcyclohexene epoxide, 3,4-epoxycyclohexylmethyl-3,4-epoxycylohexanecarboxylate, epoxy)cyclohexyl-5,5-spiro(3,4-epoxy)cyclonexane-m-dioxane; an epoxidized compound of bis(4-hydroxy)thioether; a glycidyl ether of a phenol resin that is modified by p-xylylene, m-xylylene and p-xylylene, terpene, dicylclopentadiene, cyclopentadiene, polyaromatic rings and naphthalene; a stilbene epoxy compound, and a halogenated phenol novolac epoxy compound.

The epoxy compound may be used alone or in combination of two or more kinds.

When the epoxy resin includes a liquid crystal epoxy compound A and a liquid crystal epoxy compound B having a different structure from the structure of the liquid crystal epoxy compound A, the ratio of the epoxy compound B is not particularly limited. For example, the ratio of the epoxy compound B is preferably 0.3 or less by mass, more preferably 0.2 or less by mass, further preferably 0.1 or less by mass, when the amount of the liquid crystal epoxy compound A is given as 1. The lower limit of the ratio is not particularly limited. For example, the ratio of the epoxy compound B may be 0.01 or more by mass, when the amount of the liquid crystal epoxy compound A is given as 1.

<Epoxy Resin Composition>

The epoxy resin composition according to the disclosure includes the epoxy resin as described above and a curing agent.

(Curing Agent)

The curing agent is not particularly limited, as long as it is capable of causing a curing reaction with an epoxy resin. Specific examples of the curing agent include an amine curing agent, a phenol curing agent, an acid anhydride curing agent, a polymercaptan curing agent, a polyaminoamide curing agent, an isocyanate curing agent, and a block isocyanate curing agent. The curing agent may be used alone or in combination of two or more kinds.

From the viewpoint of forming a higher-order structure in a cured product, the curing agent is preferably an amine curing agent or a phenol curing agent, more preferably an amine curing agent, further preferably a compound having two or more amino groups that are directly bonded to an aromatic ring (aromatic amine).

Examples of the amine curing agent include 3,3'-diaminodiphenylsulfone, 4,4'-diaminodiphenylsulfone, 4,4'-diaminodiphenylmethane, 4,4'-diaminodiphenylether, 4,4'-diamino-3,3'-dimethoxybiphenyl, 4,4'-diaminophenylbenzoate, 1,5-diaminonaphthalene, 1,3-diaminonaphthalene, 1,4-diaminonaphthalene, 1,8-diaminonaphthalene, 1,3-diaminobenzene, 1,4-diaminobenzene, 4,4'-diaminobenzanilide, and trimethylene-bis-4-aminobenzoate.

From the viewpoint of forming a smectic structure in a cured product of the epoxy resin composition, the curing agent is preferably 3,3'-diaminodiphenylsulfone, 4,4'-diaminodiphenylsulfone, 1,3-diaminobenzene, 1,4-diaminobenzene, 4,4'-diaminobenzanilide, 1,5-diaminonaphthalene, 4,4'-diaminodiphenylmethane or trimethylene-bis-4-aminobenzoate. From the viewpoint of obtaining a cured product having a low water absorption and a high fracture toughness, the curing agent is more preferably 3,3'-diaminodiphenylsulfone.

Examples of the phenol curing agent include a low-molecular phenol compound and a phenol novolac resin, which is obtained by linking low-molecular phenol compounds with a methylene group or the like. Examples of the low-molecular phenol compound include a monofunctional phenol compound, such as phenol, o-cresol, m-cresol and p-cresol; a difunctional phenol compound, such as catechol, resorcinol and hydroquinone; and a trifunctional phenol compound such as 1,2,3-trihydroxybenzene, 1,2,4-trihydroxybenzene and 1,3,5-trihydroxybenzene.

The amount of the curing agent in the epoxy resin composition is not particularly limited. From the viewpoint of efficiency of curing reaction, the amount of the curing agent preferably satisfies a ratio of the number of equivalent of the functional group of the curing agent to the number of equivalent of the epoxy group of the epoxy resin (number of equivalent of functional group/number of equivalent of epoxy group) being from 0.3 to 3.0, more preferably from 0.5 to 2.0.

(Filler)

The epoxy resin composition may include a filler.

In view of the strength and toughness, ceramic fibers, ceramic particles, rubber particles and the like may be used as a filler.

The content of the filler is preferably 10% by mass or more, more preferably from 20% by mass to 90% by mass, further preferably from 30% by mass to 80% by mass, with respect to the total solid content of the epoxy resin composition.

(Other Components)

The epoxy resin composition may further include a component such as a sizing agent, a coupling agent, a dispersant, an elastomer, and a solvent. From the viewpoint forming a smectic structure in a cured product, the content of the solvent is preferably smaller. Specifically, for example, the content of the solvent in the total epoxy resin composition is preferably 10% by mass or less, more preferably 1% by mass or less, further preferably 0.1% by mass or less.

The content of the epoxy resin in the epoxy resin composition is not particularly limited, and may be selected depending on the purposes.

When the epoxy resin composition includes a filler, from the viewpoint of moldability and adhesion, the content of the epoxy resin is preferably from 5% by volume to 40% by volume, more preferably from 10% by volume to 35% by volume, further preferably 15% by volume to 35% by volume, yet further preferably from 15% by volume to 30% by volume, with respect to the total solid content of the epoxy resin composition.

The content by volume of the epoxy resin with respect to the total solid content of the epoxy resin composition is calculated by the following formula.

$$\text{Content of epoxy resin (\% by volume)} = \{(Bw/Bd)/((Aw/Ad)+(Bw/Bd)+(Cw/Cd)+(Dw/Dd))\} \times 100$$

The details of the variables in the formula are as follows.
Aw: Mass composition ratio of filler (% by mass)
Bw: Mass composition ratio of epoxy resin (% by mass)
Cw: Mass composition ratio of curing agent (% by mass)
Dw: Mass composition ratio of other components (except solvent) (% by mass)
Ad: Specific gravity of filler
Bd: Specific gravity of epoxy resin
Cd: Specific gravity of curing agent
Dd: Specific gravity of other components (except solvent)

(Purpose of Epoxy Resin Composition)

The cured product of the epoxy resin composition exhibits superior toughness. Further, the cured product of the epoxy resin composition has a high degree of strength and reduced weight. Therefore, the epoxy resin composition is suitably used for composite materials such as CRRPs, package materials included in various electric or electronic appliances, sports articles, bodies of vehicles such as automobiles, ships, trains and airplanes, and structural materials such as architectural materials. Further, since the cured product of the epoxy resin composition is highly insulative, the epoxy resin composition is suitably used as insulating materials such as insulating substrates, insulating coating for electric or electronic appliances, and molding materials.

<Method of Producing Epoxy Resin Cured Product>

The method of producing an epoxy resin cured product according to the disclosure includes a process of increasing a temperature of the epoxy resin composition as described above from an ambient temperature (25° C.) to a curing temperature at a rate of not greater than 20° C./minute; and a process of curing the epoxy resin composition at the curing temperature.

According to the method, it is possible to form a phase-separated structure in a cured product of the epoxy resin composition in an efficient manner. In addition, the epoxy resin cured product produced by the method exhibits excellent toughness.

The rate of increasing the temperature of the epoxy resin composition from an ambient temperature to a curing temperature at a rate of not greater than 20° C./minute may be constant or variable.

The rate of rate of increasing the temperature of the epoxy resin composition from an ambient temperature to a curing temperature is not particularly limited as long as it is not greater than 20° C./minute. From the viewpoint of improving the toughness of the cured product, the rate is preferably not greater than 15° C./minute.

The lower limit of the rate of increasing the temperature is not particularly limited. From the viewpoint of increasing the toughness of the cured product, the rate is preferably 0.1° C./minute or more, more preferably 5° C./minute or more.

<Epoxy Resin Cured Product>

The epoxy resin cured product according to the embodiment has a phase-separated structure that is formed from two or more phases and at least one phase thereof includes a liquid crystal structure.

The epoxy resin cured product, which has a phase-separated structure that is formed from two or more phases and at least one phase thereof includes a liquid crystal structure, exhibits superior toughness as compared with a cured product of an epoxy resin that does not has a phase-separated structure as described above.

Details and preferred embodiments of the phase-separated structure of the epoxy resin cured product are the same as the details and preferred embodiments of the phase-separated structure that is formed in a cured product obtained by using the epoxy resin as described above.

<Composite Material>

The composite material according to the disclosure includes the epoxy resin cured product as described above and a reinforcing material.

The reinforcing material is not particularly limited, and may be selected depending on the purpose of the composite material. Specific examples of the reinforcing material include carbon material, glass, aromatic polyamide resins such as Kevlar (registered trade name), ultra high molecular weight polyethylene, alumina, boron nitride, aluminum nitride, mica and silicon. The form of the reinforcing material is not particularly limited, and examples thereof include fibers and particles (filler). The composite material may include a single kind of reinforcing material alone, or may include two or more kinds in combination.

<Insulating Member, Electronic Appliance, Structural Material and Vehicle>

The insulating member according to the disclosure includes the epoxy resin cured product or the composite material as described above. Examples of the insulating member include an insulating substrate, an insulating coating for electric or electronic components, and a molding material.

The electronic appliance according to the disclosure includes the epoxy resin cured product or the composite material as described above. Examples of the electronic appliance include consumer electric appliances and communication devices.

The vehicle according to the disclosure includes the epoxy resin cured product or the composite material as described above. Examples of the vehicle include automobiles, ships, trains and airplanes.

EXAMPLES

In the following, the invention is explained by referring to the Examples. However, the invention is not limited to these Examples. The "parts" and "%" described therein are based on mass, unless otherwise specified.

Example 1

A liquid crystal epoxy compound represented by the following structure (4-{4-(2,3-epoxypropoxy)phenyl}cyclohexyl=4-(2,3-epoxypropoxy)benzoate) and 4,4'-biphenol as a prepolymerization agent were allowed to react at a molar ratio of 10/2.5 (liquid crystal epoxy monomer/4,4'-biphenol), thereby synthesizing a prepolymer in which a part of the liquid crystal epoxy monomer forms a multimer through reaction with the prepolymerization agent. Hereinafter, the prepolymer is referred to as Resin 1. In the synthesis, triphenylphosphine and cyclohexanone were used as a reaction catalyst and a synthesis solvent, respectively.

A mixture was prepared by adding an epoxy compound represented by the following structure (trade name: YX4000H, Mitsubishi Chemical Corporation, hereinafter also referred to as Resin 2) to Resin 1. The amount of Resin 2 was adjusted to be 0.05 by mass with respect to the amount of Resin 1 given as 1. To the mixture, 3,3'-diaminodiphenylsulfone as a curing agent was added such that the ratio of equivalent of the epoxy group to the active hydrogen of the curing agent was 1:1, thereby obtaining a liquid crystal epoxy resin composition. Subsequently, the liquid crystal epoxy resin composition was heated to 180° C. in order to mix the curing agent, and then cooled to room temperature (25° C.).

The temperature of the epoxy resin composition was increased from an ambient temperature (25° C.) to the curing temperature (150° C.) at a rate of 2° C./minute, and the temperature was retained at 150° C. for 2 hours, thereby obtaining a cured product of the epoxy resin composition (epoxy resin cured product).

(State of Phase-Separated Structure)

The epoxy resin cured product was polished to a thickness of 50 and an interference image thereof was observed with a polarization microscope to determine the existence or non-existence of a phase-separated structure, and a state of the liquid crystal structure (existence or non-existence of a smectic structure or a nematic structure). The results are shown in Table 1, together with a maximum diameter of the domains observed in the image (domain size). The existence or non-existence of a smectic structure was determined also by X-ray diffraction measurement.

Figure 1:
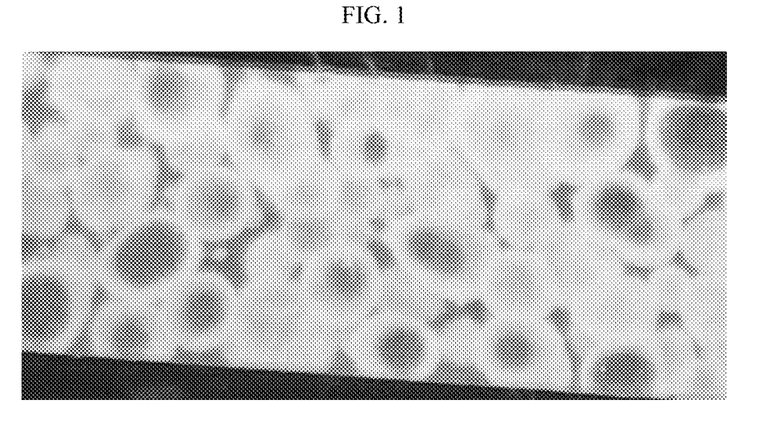
FIG. 1 is a photograph of an epoxy resin cured product having a phase-separated structure.

FIG. 1 is a photograph of an epoxy resin cured product obtained in Example 1 (800 μm in thickness and 4 mm in width). As shown in FIG. 1, a phase-separated structure having a sea-and-island structure was visually observed.

Figure 2:
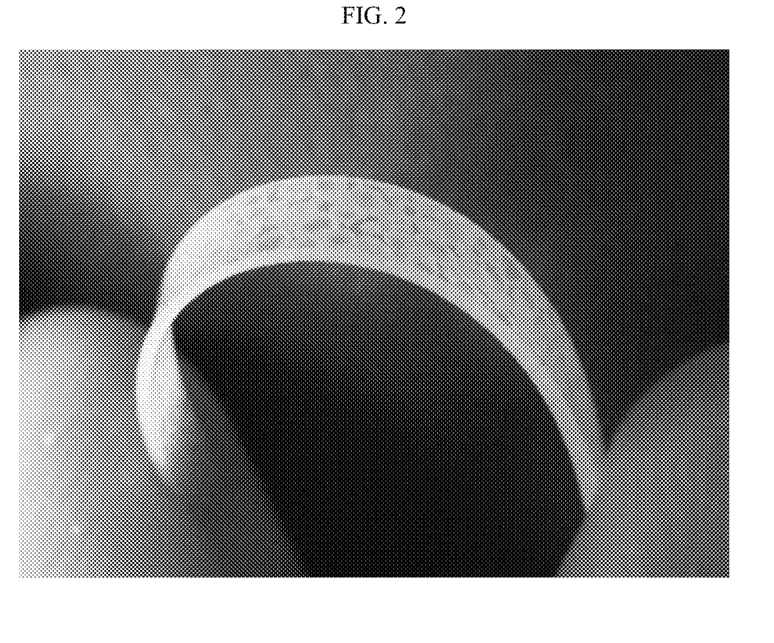
FIG. 2 is a photograph of an epoxy resin cured product having a phase-separated structure in a state of being bent.

FIG. 2 is a photograph showing the epoxy resin cured product obtained in Example 1 being bent with fingers. As shown in FIG. 2, the epoxy resin cured product was highly flexible.

Figure 3:
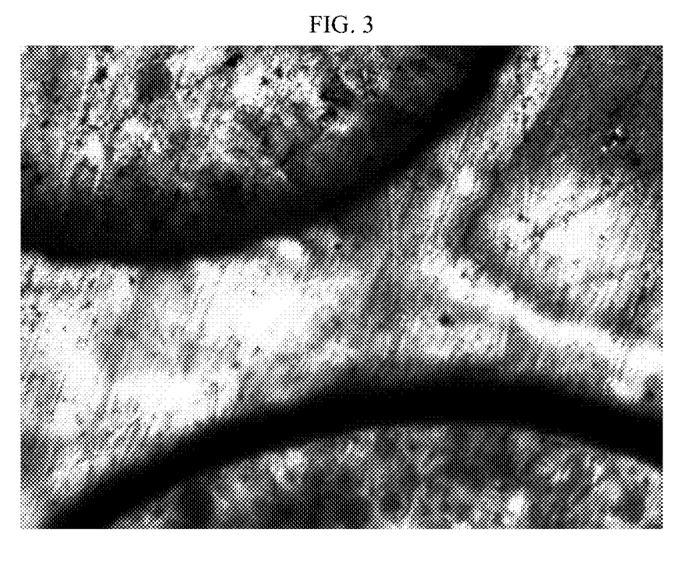
FIG. 3 is a polarization micrograph of a phase-separated structure formed in an epoxy resin cured product.

FIG. 3 is a polarization micrograph of a surface of the epoxy resin cured product obtained in Example 1. As shown in FIG. 3, the central region of the micrograph, corresponding to the sea (matrix), includes a nematic structure and the upper and lower regions, corresponding to the island (domain), include a smectic structure.

(State of Periodic Structure)

The diffraction angle derived from the periodic structure of the epoxy resin cured product was measured with a wide angle X-ray diffraction analyzer (trade name: RINT 2500HL, Rigaku Corporation). The measurement was performed using Cu as the X-ray source under the conditions of output: 50 kV and 250 mA, diffraction slit (DS): 1.0°, scattering slit (SS): 1.0°, receiving slit (RS): 0.3 mm, scanning rate: 1.0°/minute. The period length was calculated by the Bragg equation from the diffraction angle as measured.

$$2d \sin \theta = n\lambda \quad \text{Bragg equation:}$$

In the equation, d represents the length of a period, θ represents the diffraction angle, n represents the order of reflection, and λ, represents the X-ray wavelength (0.15406 nm).

With the results of the measurement, it was determined that a smectic structure was formed when a diffraction peak existed within a range of 2θ=2° to 1.0°, and it was determined that a smectic structure was not formed when a diffraction peak did not exist within a range of 2θ=2° to 1.0°.

Figure 4:
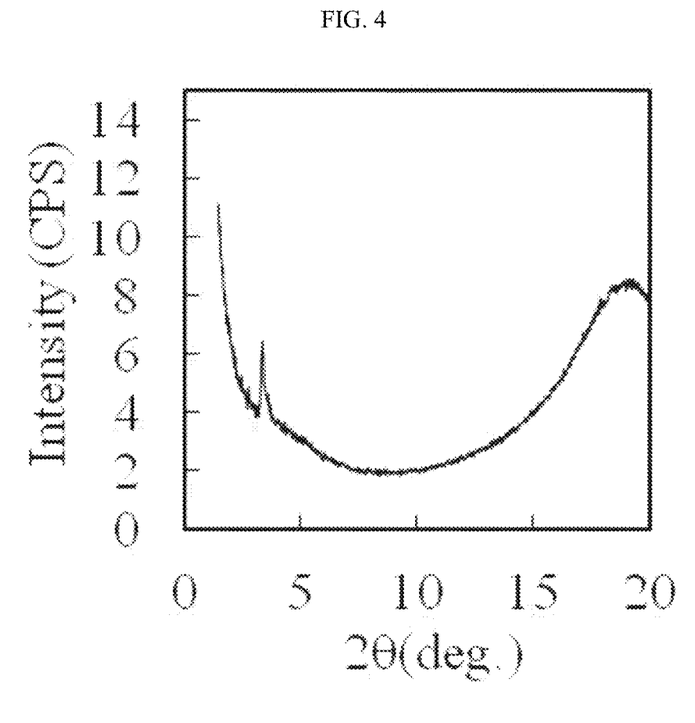
FIG. 4 is a result of X-ray diffraction measurement indicating that a phase-separated structure is formed in an epoxy resin cured product.

The result of XRD measurement indicating that a smectic structure is formed in the epoxy resin cured product obtained in Example 1 is shown in FIG. 4.

(Evaluation of Toughness)

The fracture toughness (MPa·m$^{1/2}$) was measured as an indicator for the toughness of the epoxy resin cured product. Specifically, the fracture toughness was calculated from the results of a three-point bending test according to ASTM D5045. The test was conducted using a sample of the epoxy resin cured product (3.75 mm×7.5 mm×33 mm) with a tester (trade name: INSTRON 5948, Instron). The results are shown in Table 1.

Example 2

An epoxy resin composition was prepared in a similar manner to Example 1, except that the amount by mass of Resin 2 was changed to 0.1 with respect to the amount of Resin 1 given as 1. The epoxy resin cured product was prepared using the epoxy resin composition, and the existence or non-existence of a phase-separated structure, the state of the periodic structure, the state of the liquid crystal structure and the toughness were evaluated in a similar manner to Example 1.

Example 3

An epoxy resin composition was prepared in a similar manner to Example 1, except that Resin 2 was changed to the same amount of an epoxy compound represented by the following structure (trade name: YL 6121H, Mitsubishi Chemical Corporation, hereinafter also referred to as Resin 3, a mixture of a compound in which R is a methyl group and a compound in which R is a hydrogen atom at a mass ratio of 1:1). The epoxy resin cured product was prepared using the epoxy resin composition, and the existence or non-existence of a phase-separated structure, the state of the periodic structure, the state of the liquid crystal structure and the toughness were evaluated in a similar manner to Example 1.

Example 4

An epoxy resin composition was prepared in a similar manner to Example 2, except that Resin 2 was changed to the same amount of Resin 3. The epoxy resin cured product was prepared using the epoxy resin composition, and the existence or non-existence of a phase-separated structure, the state of the periodic structure, the state of the liquid crystal structure and the toughness were evaluated in a similar manner to Example 1.

Example 5

A prepolymer (hereinafter, also referred to as Resin 4) was synthesized in a similar manner of the synthesis of Resin 1, except that the prepolymerization agent was changed to hydroquinone and the molar ratio (liquid crystal epoxy compound/hydroquinone) was changed to 10/2.0.

An epoxy resin composition was prepared in a similar manner to Example 1, except that Resin 1 was changed to the same amount of Resin 4. The epoxy resin cured product was prepared using the epoxy resin composition, and the existence or non-existence of a phase-separated structure, the state of the periodic structure, the state of the liquid crystal structure and the toughness were evaluated in a similar manner to Example 1.

Example 6

An epoxy resin composition was prepared in a similar manner to Example 2, except that Resin 1 was changed to the same amount of Resin 4. The epoxy resin cured product was prepared using the epoxy resin composition, and the existence or non-existence of a phase-separated structure, the state of the periodic structure, the state of the liquid crystal structure and the toughness were evaluated in a similar manner to Example 1.

Example 7

An epoxy resin composition was prepared in a similar manner to Example 2, except that Resin 2 was changed to the same amount of a bisphenol A epoxy compound (trade name: jER808, Mitsubishi Chemical Corporation, hereinafter also referred to as Resin 5). The epoxy resin cured product was prepared using the epoxy resin composition, and the existence or non-existence of a phase-separated structure, the state of the periodic structure, the state of the liquid crystal structure and the toughness were evaluated in a similar manner to Example 1.

Example 8

An epoxy resin composition was prepared in a similar manner to Example 1, except that the amount of Resin 2 was changed to 0.15 with respect to the amount of Resin 1 given as 1. The epoxy resin cured product was prepared using the epoxy resin composition, and the existence or non-existence of a phase-separated structure, the state of the periodic structure, the state of the liquid crystal structure and the toughness were evaluated in a similar manner to Example 1.

Example 9

An epoxy resin composition was prepared in a similar manner to Example 2, except that the rate of increasing the temperature to the curing temperature was changed to 10° C./minute. The epoxy resin cured product was prepared using the epoxy resin composition, and the existence or non-existence of a phase-separated structure, the state of the periodic structure, the state of the liquid crystal structure and the toughness were evaluated in a similar manner to Example 1.

Example 10

An epoxy resin composition was prepared in a similar manner to Example 2, except that Resin 4 was further added at an amount of 50% by mass of the amount of Resin 1. The epoxy resin cured product was prepared using the epoxy resin composition, and the existence or non-existence of a phase-separated structure, the state of the periodic structure, the state of the liquid crystal structure and the toughness were evaluated in a similar manner to Example 1.

Comparative Example 1

An epoxy resin composition was prepared in a similar manner to Example 1, except that Resin 2 was used alone as the epoxy resin. The epoxy resin cured product was prepared using the epoxy resin composition, and the existence or non-existence of a phase-separated structure, the state of the periodic structure, the state of the liquid crystal structure and the toughness were evaluated in a similar manner to Example 1.

Comparative Example 2

An epoxy resin composition was prepared in a similar manner to Example 1, except that Resin 3 was used alone as the epoxy resin. The epoxy resin cured product was prepared using the epoxy resin composition, and the existence or non-existence of a phase-separated structure, the state of the periodic structure, the state of the liquid crystal structure and the toughness were evaluated in a similar manner to Example 1.

Comparative Example 3

An epoxy resin composition was prepared in a similar manner to Example 1, except that Resin 5 was used alone as the epoxy resin. The epoxy resin cured product was prepared using the epoxy resin composition, and the existence or non-existence of a phase-separated structure, the state of the periodic structure, the state of the liquid crystal structure and the toughness were evaluated in a similar manner to Example 1.

Comparative Example 4

An epoxy resin composition was prepared in a similar manner to Example 2, except that Resin 1 was changed to the same amount of Resin 5. The epoxy resin cured product was prepared using the epoxy resin composition, and the existence or non-existence of a phase-separated structure, the state of the periodic structure, the state of the liquid crystal structure and the toughness were evaluated in a similar manner to Example 1.

Comparative Example 5

An epoxy resin composition was prepared in a similar manner to Example 1, except that the rate of increasing the temperature to the curing temperature was changed to 50° C./minute. The epoxy resin cured product was prepared using the epoxy resin composition, and the existence or non-existence of a phase-separated structure, the state of the periodic structure, the state of the liquid crystal structure and the toughness were evaluated in a similar manner to Example 1.

TABLE 1

| | Period length (nm) | Fracture toughness (MPa · m$^{1/2}$) | Phase-separated structure | Smectic structure | Nematic structure |
|---|---|---|---|---|---|
| Example 1 | 2.7 | 2.0 | YES | YES | YES |
| Example 2 | 2.7 | 2.1 | YES | YES | YES |
| Example 3 | 2.7 | 2.0 | YES | YES | YES |
| Example 4 | 2.7 | 2.1 | YES | YES | YES |
| Example 5 | 2.7 | 2.0 | YES | YES | YES |
| Example 6 | 2.7 | 2.1 | YES | YES | YES |
| Example 7 | 2.7 | 1.9 | YES | YES | NO |
| Example 8 | 2.7 | 2.0 | YES | YES | YES |
| Example 9 | 2.7 | 2.2 | YES | YES | YES |
| Example 10 | 2.7 | 2.3 | YES | YES | YES |
| Comparative Example 1 | — | 1.0 | NO | NO | NO |
| Comparative Example 2 | — | 0.9 | NO | NO | NO |
| Comparative Example 3 | — | 0.7 | NO | NO | NO |
| Comparative Example 4 | — | 0.8 | NO | NO | NO |
| Comparative Example 5 | 2.7 | 1.6 | NO | YES | NO |

In Table 1, "-" indicates that a smectic structure was not observed in the cured product and the period length was not measured.

As shown in Table 1, the epoxy resin cured product of the Examples, in which a phase-separated structure was formed and the phase-separated structure was formed from two or more phases and at least one phase included a liquid crystal structure, exhibited a greater fracture toughness than the epoxy resin cured product of the Comparative Examples, in which a phase-separated structure was not formed.

Among the Examples, the epoxy resin cured product of Examples 1-6 and 8-10, in which the phase-separated structure included both a smectic structure and a nematic structure, exhibited a greater fracture toughness than the epoxy resin cured product of Example 7, in which the phase-separated structure included only a smectic structure.

All publications, patent applications, and technical standards mentioned in this specification are herein incorporated by reference to the same extent as if each individual publication, patent application, or technical standard was specifically and individually indicated to be incorporated by reference.

The invention claimed is:

1. An epoxy resin, which is configured to form, in a cured product of the epoxy resin, a phase-separated structure that is formed from at least two phases, wherein at least one phase of the at least two phases includes a liquid crystal structure, the epoxy resin comprising:
   a liquid crystal epoxy compound A and a multimer thereof, and
   an epoxy compound B, the epoxy compound B having a different structure from a structure of the liquid crystal epoxy compound A,
   wherein the epoxy compound B is an epoxy compound that forms a different liquid crystal structure from a liquid crystal structure formed by the liquid crystal compound A or is an epoxy compound that does not form a liquid crystal structure, and
   wherein the epoxy compound B comprises a biphenyl epoxy compound or a bisphenol epoxy compound.

2. The epoxy resin according to claim 1, wherein the at least one phase includes a smectic structure or a nematic structure as the liquid crystal structure.

3. The epoxy resin according to claim 1, wherein the liquid crystal epoxy compound A has a mesogenic structure.

4. The epoxy resin according to claim 1, wherein the liquid crystal epoxy compound A is represented by the following Formula (A):

(A)

wherein, in Formula (A), X represents a linking group that includes at least one selected from the group consisting of divalent groups in the following Group (I), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group, and each n independently represents an integer from 0 to 4:

Group (I)

wherein, in Group (I), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group, each n independently represents an integer from 0 to 4, k represents an integer from 0 to 7, m represents an integer from 0 to 8, and l represents an integer from 0 to 12.

5. The epoxy resin according to claim 1, wherein the liquid crystal epoxy compound A is represented by the following Formula (M):

(M)

wherein, in Formula (M), each of $R^1$ to $R^4$ independently represents a hydrogen atom or an alkyl group having 1 to 3 carbon atoms.

6. An epoxy resin composition, comprising the epoxy resin according to claim 1, and a curing agent.

7. An epoxy resin, which is configured to form, in a cured product of the epoxy resin, a phase-separated structure that is formed from at least two phases, wherein at least one phase of the at least two phases includes a liquid crystal structure, the epoxy resin comprising:
a liquid crystal epoxy compound A and a multimer thereof, and
an epoxy compound B, the epoxy compound B having a different structure from a structure of the liquid crystal epoxy compound A,
wherein the epoxy compound B is an epoxy compound that forms a different liquid crystal structure from a liquid crystal structure formed by the liquid crystal compound A or is an epoxy compound that does not form a liquid crystal structure, and
wherein the at least one phase includes a smectic structure as the liquid crystal structure, and at least one other phase of the at least two phases includes a nematic structure as the liquid crystal structure.

* * * * *